Patented Oct. 20, 1953

2,656,333

UNITED STATES PATENT OFFICE 2,656,333

PLASTICIZED VINYL HALIDE COMPOSITION AND METHOD OF MAKING SAME

Gerson S. Schaffel and Gilbert H. Swart, Akron, Ohio, assignors to The General Tire and Rubber Company, Akron, Ohio, a corporation of Ohio No Drawing. Application May 17, 1950,
Serial No. 162,610

26 Claims. (Cl. 260—45.5)

This invention relates to a plasticized polymeric composition and to a method of making the same. It particularly relates to a plasticized polyvinyl and polyvinylidene halide compositions and to a method of making such composition having improved properties over plasticized vinyl compositions heretofore available.

Vinyl compositions such as polyvinyl chloride, polyvinylidene chloride or copolymers of these materials with various mono-olefinic compounds copolymerizable therewith, such as vinyl acetate, etc., must usually be plasticized to increase their flexibility and to give them elastic properties. The plasticizers generally used are high boiling liquid esters such as tricresyl phosphate, trioctyl phosphate, dioctyl phthalate, etc. The polymeric compounds plasticized by such materials tend to harden and break after continued use because of the loss of the liquid plasticizer. In order to prevent such difficulties, it has been proposed to plasticize polyvinyl chloride at least in part with rubbery acrylonitrile-butadiene copolymers, such for example as those sold under the trade names "Perbunan," "Hycar-Or," etc. These rubbery copolymers may be blended with the solid polyvinyl chloride by mastication on mill rolls or by other suitable means. The resultant plasticized article has a very short softening range which renders it very difficult to calender into thin films and has limited general applicability. It is also subjected to the disadvantage of hardening much too rapidly as the temperature is reduced. Acrylo-nitrile-diolefine copolymers have been considered to be specific plasticizers for polyvinyl chloride inasmuch as other rubbery polymers, such for example as GRS (butadiene-styrene copolymer), Vistanex (polyisobutylene), Butyl rubber (copolymer of isoprene or butadiene and isobutylene), and the like are found to be incompatible with polyvinyl chloride and polyvinylidene chloride. The films formed of such mixtures are cloudy and have very poor physical properties, with the result that they cannot be utilized to advantage.

It is an object of the present invention to provide a plasticized polyvinyl composition which contains a relatively low amount, if any, of fleeting or liquid plasticizer and which is easier than polyvinyl compositions plasticized with butadieneacrylontrile rubbers to calender into thin sheets or films.

It is another object of the present invention to provide a method of making plasticized polyvinyl compositions which may be formed into films having high tear resistance and having other desirable properties without utilizing appreciable amounts of any fleeting or liquid plasticizer.

It is still another object of the present invention to provide plasticized polymers and copolymers of vinyl chloride properties and to provide methods of making such plasticized compositions.

Other objects will be apparent from the following description of the invention.

Copolymers of one or more conjugated diolefins with varying percentages of mono-olefinic or mono - vinyl carbonyl - containing monomers which are copolymerizable with said conjugated diolefin and which have a carbon atom with 2 and only 2 valences thereof connected directly to oxygen have been made. The carbonyl group of said monomers is preferably in conjugated relationship to an unsaturated group which enters into the copolymerization reaction. These carbonyl-containing monomers include (a) the unsaturated aliphatic and mixed aliphatic aromatic ketones such as methylisopropenylketone, methylvinylketone and vinylphenylketone which have the carbonyl group in conjugated relation to the unsaturated aliphatic (olefinic or vinyl) group, (b) the aliphatic polymerizable aldehydes such as methacrolein which also has the olefinic double bonds conjugated to the double bonds of the carbonyl group, and (c) polymerizable or copolymerizable olefinic compounds in which the carbonyl group is substantially removed from the group which enters into the polymerization. These latter compounds include the polymerizable olefins that have the olefinic group activated by an aryl group of an aromatic ketone, such as phenyl methylketone and the like. Preferred examples of these compounds are acetyl styrene and acetyl alpha-methyl-styrene having the acetyl group para or meta to the isopropenyl group and having the carbon atoms which are ortho to the isopropenyl group connected to hydrogen. These rubber copolymers, of which the copolymers of methylvinylketone and methylisopropenylketone are good examples, have many properties quite closely analogous to those of butadiene and styrene and were considered in the rubber program as possible contenders for the most satisfactory general purpose synthetic rubber.

In the copending applications of Gerson S. Schaffel and Kermit V. Weinstock which are assigned to the assignee of the present invention, it is pointed out that certain of the aforementioned copolymers of a diolefin and a carbonyl-containing mono-olefinic compound copolymerizable therewith are curable with formaldehyde and certain formaldehyde derivatives to give rubbery polymers which when cured have excellent physical properties, and particularly low permanent sets and low hysteresis and low aging losses. In accordance with the present invention we have found that these same copolymers of a diolefinic compound, such as butadiene, isoprene, chloroprene, cyanoprene, dimethlybutadiene and the like with copolymerizable carbonyl-containing monoolefinic compounds, such for example as methylvinylketone, methylisopropenylketone, acetylstyrene and the like are compatible with polyvinyl halide resins, such as polyvinyl chloride, polyvinylidene chloride, copolymers of these materials, and copolymers of one or more of these materials with vinyl acetate and the like.

We have further found that polyvinyl compositions plasticized with these copolymers of diolefinic monomers with carbonyl-containing mono-olefins copolymerizable therewith have extremely desirable physical properties. They have a comparatively flat temperature vs. plasticity characteristic at softening temperatures, i. e. they are deformable but not too soft to calender over a considerable temperature range, with the result that they may be formed into films, sheets or molded articles. The formed articles have excellent tear resistance and physical properties. They have reasonably good low temperature properties, especially when a liquid plasticizer is also present in relatively small amount.

The polyvinyl compositions suitable for use in accordance with the present invention comprise polymers and copolymers of mono-olefinic materials having the following general formula,

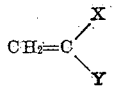

where Y is halogen, such as chlorine, fluorine and bromine (preferably chlorine), and where X is selected from the group consisting of hydrogen and halogen (including fluorine, chlorine, bromine and iodine), and preferably from the group consisting of hydrogen and chlorine. Examples of such mono-olefinic compounds include vinyl chloride, vinyl fluoride, vinylidene chloride, vinyl bromide, etc. These monomeric materials, either alone or in admixture with one or more of the others, may be polymerized in the solid or resinous state either en masse or by any of the various known emulsion polymerization techniques, as desired.

In the preferred process of the present invention, the polymerized vinyl compound is plasticized by mixing the polymerized rubbery copolymer therewith, i. e. the two polymers are mixed and then fluxed together at elevated temperature above the softening point of the polyvinyl component. However, some of the benefits of the present invention may also be accomplished by polymerizing a mixture of conjugated diolefins or diolefinic compounds of less than seven aliphatic carbon atoms, as above-mentioned, and a carbonyl-containing mono-olefinic compound simultaneously and in admixture with one or more vinyl halide monomers as above set forth.

The rubbery plasticizer may be prepared by copolymerizing the polymerizable conjugated diolefinic compound or compounds containing less than seven aliphatic carbon atoms and the copolymerizable mono-olefinic compound containing a carbonyl group in any suitable way. However, emulsion polymerization technique is preferred in order to give a latex that may readily be blended with dispersions or latices of the polyvinyl component.

The carbonyl-containing monomer provides compatibility between the rubbery copolymer and the polyvinyl halide. It may be the sole compatibility-producing compound in the rubbery copolymer, or it may be supplemented by another relatively polar monomer, such for example as acrylonitrile and/or methacrylonitrile. The compatibility-producing component for optimum compatibility combined with plasticizing action should be about 50% by weight of the mixture forming the copolymer. When the amount of conjugated diolefinic compound computed as butadiene or diolefin in the rubbery plasticizer reaches 60 per cent of the weight thereof, the compatibility of the copolymer with the vinyl halide resins is somewhat less. Conversely, when the amount of diolefinic component is less than 40 per cent, the rubbery properties of the copolymer become adversely affected and the efficiency of the product as a plasticizer is greatly reduced. It is therefore desirable that the rubbery plasticizer comprise 40 to 60 per cent of a conjugated diolefin or diolefinic compound, and 60 to 40 per cent of the compatibility-producing component, such as methylisopropylketone or other above-described copolymerizable carbonyl-containing monomers, or a mixture of one or more such monomers with an acrylonitrile such as acrylonitrile or methacrylonitrile.

The carbonyl-containing mono-olefins in the compatibility-producing component of the rubbery polymer preferably should be in excess of the total of the other relatively polar monomers, such as the acrylonitrile, although as little as 5 per cent of the carbonyl-containing mono-olefin gives noticeably improved properties to a copolymerization product comprising a conjugated diolefin or diolefinic compound in an amount up to 65 per cent, together with at least 30 per cent of additional compatibility-producing monomer such as an acrylonitrile. While rubbery copolymers of a conjugated diolefinic compound such as butadiene-1,3 and a carbonyl-containing mono-olefin, such as methylisopropenylketone, which is prepared in accordance with any copolymerization process, are effective in providing plasticized polyvinyl compositions with greatly improved properties, the copolymers having high plasticity are far superior.

The usual rubbery polymers of these materials have a Mooney viscosity well above 50 points on the Mooney plastometer, as measured under standard conditions. We have found that such rubbers apparently stiffen up quite early at low temperatures. When the rubbery copolymers are prepared in such a manner that they have high plasticity or a relatively low Mooney reading for rubbers, i. e. Mooney reading below 30 and preferably below 20 so that they are almost viscous liquids, the plasticized vinyl compounds have vastly improved low temperature properties, and in fact, are much more desirable at ordinary temperatures. The preferred rubbery plasticizers of the present invention, therefore, have (when the plasticized material is to be used for forming thin films) a Mooney plasticity well under 30 and even lower than the lowest measurable value as measured under conditions promulgated by Rubber Reserve Corporation. When a thicker or embossed film is to be produced from the plasticized material, a much higher plasticity is preferred. The plasticity may be readily regulated by incorporation of modifiers into the polymerization system, especially when emulsion polymerization technique is used. Such modifiers include various long-chain mercaptans, such as dodecyl mercaptan, tertiary 16-carbon atom mercaptans, and various other mercaptans of 7 to 18-carbon atoms, as well as xanthogen disulfides, etc., all as well known in the art.

In preparing the blends or the plasticized vinyl compounds of the present invention, it is preferred that the plasticizer be mixed with the vinyl composition while it is in the form of a latex or aqueous dispersion as obtained directly from emulsion polymerization techniques. The vinyl compound is also preferably in the form of a latex or aqueous slurry of relatively fine particles and may be obtained directly from emulsion or suspension polymerization processes. The polyvinyl particles stiffen or detackify the particles of the rubbery polymer during the drying step to such an extent that it is comparatively easy to dry the resultant coagulum on conventional drying apparatus. This permits one to manufacture a much lower Mooney rubber for the plasticizer than is otherwise commercially feasible, for when such low Mooney rubbery materials are dried without the addition of pigment or finely divided polyvinyl composition, they tend to flow and entrap the water with the result that the drying is accomplished only with tremendous difficulty.

The amount of rubbery plasticizer in the vinyl composition may be varied greatly and determines the character of the final product. Small amounts, such as 5 parts or so, of plasticizer in the composition gives a very noticeable plasticizing effect and the rubbery nature of the product is increased as the amount of rubbery plasticizer is increased. Even as much as 95 per cent of rubbery material may be present, particularly when this mixture is to be further diluted with additional vinyl composition. The presence of as little as 5 per cent of polyvinyl composition in the plasticizer facilitates the addition of more polyvinyl resin.

While the rubbery plasticizer is generally the sole plasticizer used in preparing the plasticized polyvinyl compounds of the present invention, a large proportion of the benefits of the present invention may also be obtained by combining rubbery plasticizer with one or more of the various high boiling liquid plasticizers heretofore proposed. In some instances, as little as 1 per cent of the rubbery plasticizer may be present to decrease the bleeding of the liquid plasticizer from the composition.

The phenol compositions of the present invention, particularly when they contain relatively small amounts of liquid plasticizer, have excellent aging properties and very high tear resistance, and good low temperature properties when the plasticizer is of the low Mooney variety. In fact, the tear resistance is frequently as much as five times as great as is the tear resistance of a polyvinyl resin plasticized with a butadiene-acrylonitrile copolymer which does not contain any carbonyl-containing mono-olefinic compound.

Of all the carbonyl-containing mono-olefinic compounds, it is found that the methylisopropenylketone produces with a conjugated diolefinic compound as above-described a rubbery copolymer of most outstanding characteristics for combination with polyvinyl halide resins. In this monomer it apparently appears that the carbonyl groups and hydrocarbon groups have the precise balance which is required to give the utmost in compatibility and plasticizing action. The other rubbery polymers, however, may also be used to give a major portion of the benefits of the present invention.

The following examples, in which parts are by weight, illustrate the present invention:

*Example 1*

| | Parts |
|---|---|
| Butadiene-1,3 | 100 |
| Methylisopropenylketone | 100 |
| 5 per cent aqueous solution of dehydrogenated rosin soap | 360 |
| Dodecyl mercaptan | 1 |
| Potassium persulfate | .3 |

The above ingredients are placed in an autoclave and maintained at 50° C. under constant agitation until a latex is formed having a solids content corresponding to about 72 per cent conversion. The remaining monomeric materials are distilled therefrom in usual manner to provide an aqueous dispersion of a compounding material to be used as described in one or more of the examples.

*Example 2*

| | Parts |
|---|---|
| Butadiene | 50 |
| Methylisopropenylketone | 50 |
| Standard rubber reserve soap (substantially sodium stearate) | 5 |
| Water | 180 |
| Tertiary | 2 |
| Carbon atom mercaptan | 16 |
| Potassium persulfate | 3 |

The above ingredients are agitated in an autoclave maintained at 50° C. until the conversion of 95 per cent based on the monomers is obtained. The coagulated latex had a four minute Mooney viscosity of 10 when measured under standard conditions recognized throughout the synthetic rubber industries.

*Example 3*

When in Example 2, 25 parts of methylisopropenylketone is substituted by an equal weight of acrylonitrile, other conditions remaining the same except that mercaptan was reduced to 1 part, the rubber polymer obtained is treated as in Example 1 to provide an aqueous dispersion of a compounding material.

*Example 4*

| | Parts |
|---|---|
| 25 per cent aqueous dispersion of polyvinylchloride | 200 |
| Latex or aqueous dispersion of Example 1 | 180 |
| Antioxidant (heptylated diphenol amine obtainable under the trade-name Agerite-Stalite) | 2 |
| Vinyl stabilizer (lead stearate) | 2 |

The above ingredients are mixed thoroughly and the mixture coagulated by a mixture of electrolyte, such as sodium chloride, to a crumb. The crumb is washed and dried and the resultant product masticated between rollers, for example a rubber mill at a temperature of 240° F. to 350° F. The resultant product was calendered to a film of 0.12" thick. The resultant film had excellent tensile strength and had a rough surface desirable for upholstery fabrics.

Example 5

The latex or aqueous dispersion of Example 1 was substituted by an equal volume of the latex produced in Example 2, other conditions remaining the same, the resultant product was calendered to a smooth film of .004 inch thick. The resultant product had excellent tensile strength. The film was clear and smooth and had good aging and characteristics retaining its original flexibility for seven days at 100° F. in an air oven.

Example 6

An aqueous dispersion of Example 1 was coagulated with salt and washed and dried with 2 parts of the antioxidant (based on solids content). 50 parts of powdered polyvinyl chloride was dry blended with lead silicate and fused on a mill at 310° F. and the dried rubbery polymer added slowly thereto. The blended product was calendered to a film of .004 inch thick to provide a desirable but somewhat rough film.

Example 7

When the aqueous dispersion of the polymer prepared in accordance with Example 2 was substituted in Example 6 for the aqueous dispersion of polymer of Example 1, other conditions remaining the same, the resultant film was clear and colorless and had a smooth finish desirable for drapery fabric, packaging materials and the like.

Example 8

The polyvinyl chloride of Example 5 was substituted by 200 parts of 25 per cent aqueous dispersion of a copolymer of 90 parts by weight of vinylidene chloride and 10 parts by weight of vinyl chloride, other conditions and procedures remaining the same as in Example 5. The resultant film has good properties.

Example 9

The latex of Example 2 was coagulated with electrolyte such as salt and the resultant crumb filtered, washed and dried. 75 parts of this dried crumb was placed on a cold rubber mill and formed into a band thereon. Into the band thus formed was masticated slowly about 30 parts of powdered polyvinyl chloride. After the vinyl chloride was dispersed into the rubbery polymer the temperature of the mill rolls was raised so that the batch reached a temperature of about 310° F. The dispersed vinyl chloride was fluxed at this temperature into the rubbery polymer and a homogeneous mix was obtained. The mixture formed films that had excellent properties.

Example 10

50 parts of a finely powdered polyvinyl chloride was dispersed in water by means of suitable grinding in a ball mill. A small amount of water soluble soap was present as a dispersing agent. The resultant dispersion was substituted for the 200 parts of polyvinyl chloride of Example 4, other conditions remaining the same. The resultant polymer was sheeted to form the film which had desirable characteristics for commercial use.

The relative proportions of the polyvinyl chloride and/or polyvinylidene polymer to the rubbery polymer in the above examples may vary very widely. Benefits of the present invention may be obtained with as little as 5 or 10 per cent of the rubbery polymer in a mixture having 90 to 95 per cent of the polyvinyl resin. Similarly, the results of the present invention may also be obtained with as little as 5 to 10 per cent of the polyvinyl resin in a mixture with 90 to 95 per cent (based on the total of the weight of the mixture) of the rubbery polymer. The percentage of the rubbery polymer may be varied as aforementioned to obtain a varying degree of plasticity.

While in the above examples methylisopropenylketone is used to illustrate the invention, this ingredient may be substituted in whole or in part by other polymerizable carbonyl containing mono-olefinic compounds (i. e. contain a single polymerizable olefinic group) to obtain rubber polymers which are compatible with polyvinyl and polyvinylidene halides as above set forth. Those carbonyl-containing monomers having an isopropenyl group, such for example as methylisopropenylketone and meta or para acetyl substituted alpha-methylstyrenes, are found to be especially desirable and superior to the other polymerizable carbonyl-containing mono-olefinic compounds inasmuch as they form copolymers which have substantially greater uniformity. This is perhaps occasioned by the steric hinderance caused by the alpha-methyl group which decreases the ease of homopolymerization of these monomers so that the greatest tendency is to form copolymers with the diolefinic compounds such as butadiene etc. Intimate mixtures of the vinyl polymer above-mentioned having relatively large proportions of the rubbery copolymer therein are especially desirable plasticizers for addition to resinous materials of various types. Thus, when the proportions of the latices or aqueous dispersions of Example 1 are regulated so that there is only a small portion of polyvinyl chloride, say as little as 1 per cent, the mixture of the resultant product is easily dispersed in vinyl resins and is highly desirable for use as a plasticizer.

The present invention is also applicable to the formation of plasticized polar resins generally. Thus benefits of the present invention are obtained when part or all of the polyvinyl chloride in the above examples is substituted by resins containing polar groups such as =CO; —SO$_2$: —OH; —NH$_2$; —NO$_2$; Cl; —CN; —COOR (where R is hydrogen or an organic radical). Examples of these polar resins are those resins which contain at least one polar group for each six carbon atoms and which melt above 140° C. such as do the copolymers of acrylonitrile and styrenes (including those styrenes and alpha-methylstyrenes having halo and/or methyl substituents, such for example as the mono-chloro and dichlorostyrenes and the 3-chloro-4-methylstyrenes and alpha-methylstyrenes and the 3,4-dichloro-alpha-methylstyrenes), the polymers and copolymers of the halogenated styrenes and alpha-methylstyrenes, which latter have nuclear carbon atoms next adjacent to the isopropenyl group connected to hydrogen. Acrylonitrile or methacrylonitrile copolymers with styrenes containing 10 to 80 or 90 per cent by weight of acrylonitrile are like polyvinyl chloride and particularly well adapted to the production of films and other resinous objects when plasticized with any one or more copolymers described above in the same manner as illustrated by polyvinyl chloride.

In the appended claims the term polymer is used in its generic sense to include copolymers. In accordance with the claims "hydrocarbon element" is an element also found in hydrocarbons,

What we claim is:

1. A thermoplastic composition comprising an intimate mixture of (1) a solid polymer of a mono-olefinic material having the general formula

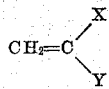

where Y is a halogen having an atomic weight less than 80 and where X is a member of the group consisting of hydrogen and a halogen having an atomic weight less than 80 and (2) a copolymer of a polymerizable conjugated diolefinic compound of less than seven carbon atoms in a straight chain with a carbonyl containing mono-olefinic material copolymerizable therewith and said mono-olefinic material being further characterized by having a carbonyl group, the carbon of which has only 2 of its 4 valence bonds connected directly to oxygen, a third valence connected directly to carbon and the remaining valence bond directly connected to one of the elements found in hydrocarbons.

2. A thermoplastic composition comprising an intimate mixture of (1) a polymer of mono-olefinic material having the general formula

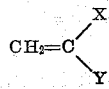

where Y is a halogen having an atomic weight less than 80 and where X is a member of the group consisting of hydrogen and said halogen and (2) a copolymer of a polymerizable conjugated diolefinic compound of less than seven carbon atoms in a straight chain with a carbonyl containing mono-olefinic material copolymerizable therewith and said mono-olefinic material being further characterized by having a carbonyl group, the carbon of which has only 2 of its 4 valence bonds connected to oxygen, a third valence connected directly to carbon and the remaining valence bond directly connected to an element selected from the group consisting of carbon and hydrogen, said copolymer being present in amounts of 10 to 90 per cent of said thermoplastic composition and said polymer being present in amounts of 90 to 10 per cent of said plastic composition.

3. A product according to claim 1 in which at least part of the said carbonyl-containing mono-olefinic material is methylisopropenylketone.

4. A product according to claim 1 in which at least part of the said carbonyl-containing mono-olefinic material is an unsaturated aliphatic ketone having said carbonyl group in conjugated relation with the olefin group thereof.

5. A product according to claim 1 in which at lease part of the said carbonyl-containing mono-olefinic material is an isopropenyl compound.

6. A product according to claim 1 in which said mono-olefinic material of the general formula is vinyl chloride and said carbonyl-containing mono-olefinic material is an acetyl styrene.

7. A product according to claim 1 in which said mono-olefin of the general formula is vinyl chloride and said carbonyl-containing mono-olefinic material is methylisopropenylketone.

8. A product according to claim 1 in which said mono-olefin of the general formula shown is vinyl chloride and said carbonyl-containing mono-olefinic material is methylisopropenylketone and said diolefinic compound is a diolefin.

9. A product according to claim 1 in which said mono-olefin of the general formula shown is vinyl chloride and said carbonyl-containing mono-olefinic material is methylisopropenylketone and at least part of said diolefinic compound is a diolefin.

10. A method of making a plasticized polymer of a mono-olefinic material of the general formula

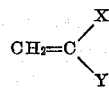

where Y is a lower atomic weight halogen having an atomic weight less than 80 and where X is a member of the group consisting of hydrogen and a lower atomic weight halogen having a molecular weight of less than 80 which comprises intimately mixing a polymer of said mono-olefinic material with a copolymer of a polymerizable conjugated diolefinic compound of less than seven carbon atoms in a straight chain with a carbonyl-containing mono-olefinic material copolymerizable therewith and said mono-olefinic material being further characterized by having a carbonyl group, the carbon of which has only 2 of its 4 valence bonds connected to oxygen, a third valence connected directly to carbon and the remaining valence bond directly connected to an element selected from the group consisting of carbon and hydrogen.

11. A method of making a plasticized polymer of a mono-olefinic material of the general formula

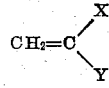

where Y is a lower atomic weight halogen having a molecular weight of less than 80 and where X is a member of the group consisting of hydrogen and said lower atomic weight halogen having a molecular weight of less than 80 which comprises intimately mixing an aqueous dispersion of a polymer of said mono-olefinic material with an aqueous dispersion of a copolymer of a polymerizable conjugated diolefinic compound of less than seven carbon atoms in a straight chain with a carbonyl-containing mono-olefinic material copolymerizable therewith and said mono-olefinic material being further characterized by having a carbonyl group, the carbon of which has only 2 of its 4 valence bonds connected to oxygen a third valence connected directly to carbon and the remaining valence bond directly connected to an element selected from the group consisting of carbon and hydrogen, coagulating and drying the resultant latex mixture and separating the solids of said resultant mixed aqueous dispersions from substantially all of the water.

12. A method of claim 11 wherein the substantially dry solids are thereafter masticated at an elevated temperature.

13. The method of claim 10 wherein said copolymer is first added to relatively cold mill rolls and said polymer in finely divided state is dispersed therethrough and the mixture thus produced is thereafter subjected to a temperature sufficiently high to cause coalescence and homogeneity of the resultant mixture.

14. The method according to claim 10 wherein said polymer is masticated at elevated temperature sufficiently to render it plastic and said copolymer is incorporated into the thus plasticized polymer by mastication.

15. A thermoplastic composition comprising an intimate mixture of (1) a polymer of vinylchloride comprising a major proportion of residual elements from polymerization of vinylchloride and (2) a copolymer of a diolefinic compound of less than seven carbon atoms in a straight chain with a copolymerizable olefinic ketone, and a member of the group consisting of acrylonitrile and methacrylonitrile the amount of ketone in said copolymer being at least 5 per cent of the weight thereof, the total amount of olefinic ketone and of acrylonitrile and methacrylonitrile present in said copolymer being 60 to 40 per cent of the weight of the copolymer and the total amount of diolefinic compounds in said copolymer being 40 to 60 per cent of the weight thereof, said copolymer being present in said thermoplastic composition in the amount of 1 per cent to about 95 per cent thereof and the said polymer of vinylchloride constituting at least 5 per cent of the weight of said composition.

16. The product according to claim 15 in which at least part of the total amount of said diolefinic compound is a diolefin.

17. The product according to claim 15 in which said copolymer comprises methylisopropenyl ketone in an amount of at least 5 per cent of the weight of said copolymer.

18. A thermoplastic composition comprising an intimate mixture of (1) a polymer of vinyl chloride comprising a major proportion of residual elements from vinyl chloride and (2) a copolymer of a diolefinic compound of less than seven carbon atoms in a straight chain with methylisopropenyl ketone, the amount of said ketone in said copolymer being 60 to about 40 per cent of the weight of said copolymer and the diolefinic compound in said copolymer being 40 to 60 per cent of the weight thereof, said copolymer being present in said composition in the amounts of 5 to 95 per cent of the weight thereof and said vinyl chloride being present in said composition in the amount of 5 to 95 per cent of the weight thereof.

19. The product according to claim 15 in which the copolymer has a Mooney viscosity, large rotor, reading of not in excess of 30.

20. The product according to claim 18 in which the copolymer has a Mooney viscosity, large rotor, reading of not in excess of 30.

21. The product according to claim 18 in which said copolymer and polymer of vinyl chloride are present in about equal amounts.

22. The product according to claim 15 in which residual elements from methyl-isopropenyl ketone constitute a major proportion of the total of residual elements from olefinic ketones and acrylonitriles.

23. A method of making a plasticized polymer of a mono-olefinic material of the general formula

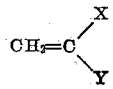

where Y is a halogen having an atomic weight less than 80 and where X is a member of the group consisting of hydrogen and a halogen having a molecular weight of less than 80 which comprises intimately mixing a polymer of said mono-olefinic material with a copolymer of a polymerizable conjugated diolefine compound of less than seven carbon atoms in a straight chain and methylisopropenylketone.

24. A method of making a plasticized polymer of a mono-olefinic material of the general formula

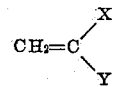

where Y is a halogen having a molecular weight of less than 80 and where X is a member of the group consisting of hydrogen and a halogen having a molecular weight of less than 80 which comprises intimately mixing an aqueous dispersion of a polymer of said mono-olefinic material with an aqueous dispersion of a copolymer of a polymerizable conjugated diolefinic compound of less than seven carbon atoms in a straight chain and methylisopropenylketone.

25. A thermoplastic composition comprising an intimate mixture of (1) a polymer of a mono-olefinic material of the general formula

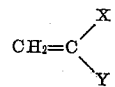

where Y is a halogen having an atomic weight less than 80 and where X is a member of the group consisting of hydrogen and a halogen having a molecular weight of less than 80, and (2) a copolymer of a polymerizable conjugated diolefine compound of less than seven carbon atoms in a straight chain and methylisopropenylketone, said copolymer being present in amounts of 10 to 90 per cent of said composition.

26. A thermoplastic composition comprising an intimate mixture of (1) a polymer of vinylchloride comprising a major proportion of polyvinylchloride, and (2) a copolymer of a polymerizable conjugated diolefine compound of less than seven carbon atoms in a straight chain and methylisopropenylketone, said copolymer being present in amounts of 10 to 90 per cent of said composition.

GERSON S. SCHAFFEL.
GILBERT H. SWART.

References Cited in the file of this patent

UNITED STATES PATENTS

| Number | Name | Date |
|---|---|---|
| 1,901,354 | Meisenburg | Mar. 14, 1933 |
| 2,302,445 | Kiesskalt et al. | Nov. 17, 1942 |
| 2,383,782 | Dreisbach | Aug. 28, 1945 |
| 2,500,983 | Frolich et al. | Mar. 21, 1950 |
| 2,512,697 | TeGrotenhuis | June 27, 1950 |

FOREIGN PATENTS

| Number | Country | Date |
|---|---|---|
| 539,834 | Great Britain | Sept. 25, 1941 |
| 599,937 | Great Britain | Mar. 24, 1948 |